United States Patent [19]

Speier

[11] Patent Number: 5,383,696
[45] Date of Patent: Jan. 24, 1995

[54] MULTI-PURPOSE SHOVEL LIKE TOOL

[76] Inventor: Guenter O. Speier, 22912 Cordoba Ct., Salinas, Calif. 93908

[21] Appl. No.: 126,173

[22] Filed: Sep. 23, 1993

[51] Int. Cl.6 .............................................. A01B 1/04
[52] U.S. Cl. ...................................... 294/49; 209/419
[58] Field of Search .................... 294/49, 50.6, 51, 52, 294/55, 55.5; 7/114, 116; 56/8, 400.01, 400.04–400.07, 400.11; 172/371, 378, 380; 209/417–419

[56] References Cited

U.S. PATENT DOCUMENTS

| | | | |
|---|---|---|---|
| 420,106 | 1/1890 | Rowland | 294/55 X |
| 1,094,161 | 4/1914 | Mueller . | |
| 1,277,279 | 8/1918 | Wiley . | |
| 1,427,523 | 8/1922 | Doyle . | |
| 1,458,910 | 6/1923 | Tonke | 294/55.5 |
| 1,554,525 | 3/1925 | Ricci . | |
| 2,432,643 | 10/1945 | Wotring . | |
| 3,146,831 | 9/1964 | McConnell | 56/400.04 X |
| 3,672,716 | 6/1972 | Burckhalter | 294/50.6 |
| 4,491,357 | 1/1985 | Richards | 294/49 |
| 4,988,005 | 1/1991 | Graham . | |
| 4,999,982 | 3/1991 | Kriger | 56/400.01 X |

FOREIGN PATENT DOCUMENTS

| | | | |
|---|---|---|---|
| 29156 | 1/1922 | Denmark | 294/55.5 |
| 284229 | 5/1915 | Germany | 294/55.5 |
| 58378 | 10/1946 | Netherlands | 294/49 |
| 2212373 | 7/1989 | United Kingdom | 294/49 |

Primary Examiner—Johnny D. Cherry
Attorney, Agent, or Firm—Townsend and Townsend Khourie and Crew

[57] ABSTRACT

A shovel is disclosed having a conventional shovel handle and yoke with the surface formed of flattened expanded metal. The flattened expanded metal is conventional and of the type that forms a grid of four sided diamond shaped openings having an elongate dimension and a short dimension. The flattened expanded metal is aligned parallel to the handle of the shovel and cut to a width and length sufficient to form the shovel body. The left and right edges as well as the top of the expanded metal are lined with straight bars to impart even and uninterrupted side edges and a foot hold top edge adjacent the yoke. The flattened metal forming the body of the shovel is given a conventional arcuate section and formed from metal having sufficient strength that all necessary support for the shovel surface is from the flattened metal. The front edges are cut to expose the elongate diamonds of the flattened expanded metal in a serrated configuration with at least the front serrated edge being hardened. There results a shovel like tool which at the serrated edges can be used for raking, weed trimming and the like in addition to having all of the regular advantages of a grid-like shovel.

1 Claim, 2 Drawing Sheets

MULTI-PURPOSE SHOVEL LIKE TOOL

This invention relates to a multi-purpose shovel like tool. Specifically, a multi-purpose shovel like tool is disclosed, fabricated from standard flattened metal, to produce a self supporting shovel like body having tines like members at the leading and trailing ends of the shovel like body.

BACKGROUND OF THE INVENTION

Scoops or shovels having a mesh surface instead of a flat continuous surface are known. In the usual application, a rigid peripheral frame is provided. Thereafter, the mesh is strung across the rigid peripheral frame. This imparts to the sides, and especially the leading and trailing edges of such shovels, a smooth and uninterrupted edge. Further, the main degree of strength of such shovels or scoops is from the peripheral frame; the mesh surface merely constitutes a netting like structure strung across the frame which, but for the frame, would have insufficient strength to stand alone as the shovel surface.

SUMMARY OF THE INVENTION

A shovel is disclosed having a conventional shovel handle and yoke with the surface formed of flattened expanded metal. The flattened expanded metal is conventional and of the type that forms a grid of four sided diamond shaped openings having an elongate dimension and a short dimension. The flattened expanded metal is aligned parallel to the handle of the shovel and cut to a width and length sufficient to form the shovel body. The left and right edges as well as the top of the expanded metal are lined with straight bars to impart even and uninterrupted side edges and a foot hold top edge adjacent the yoke. The flattened metal forming the body of the shovel is given a conventional arcuate section and formed from metal having sufficient strength that all necessary support for the shovel surface is from the flattened metal. The front edges are cut to expose the elongate diamonds of the flattened expanded metal in a serrated configuration with at these edges being hardened. There results a shovel-like tool which at the serrated edges can be used for raking, weed trimming and the like in addition to having all of the regular advantages of a grid-like shovel.

DESCRIPTION OF THE PREFERRED EMBODIMENT

Figure 1:
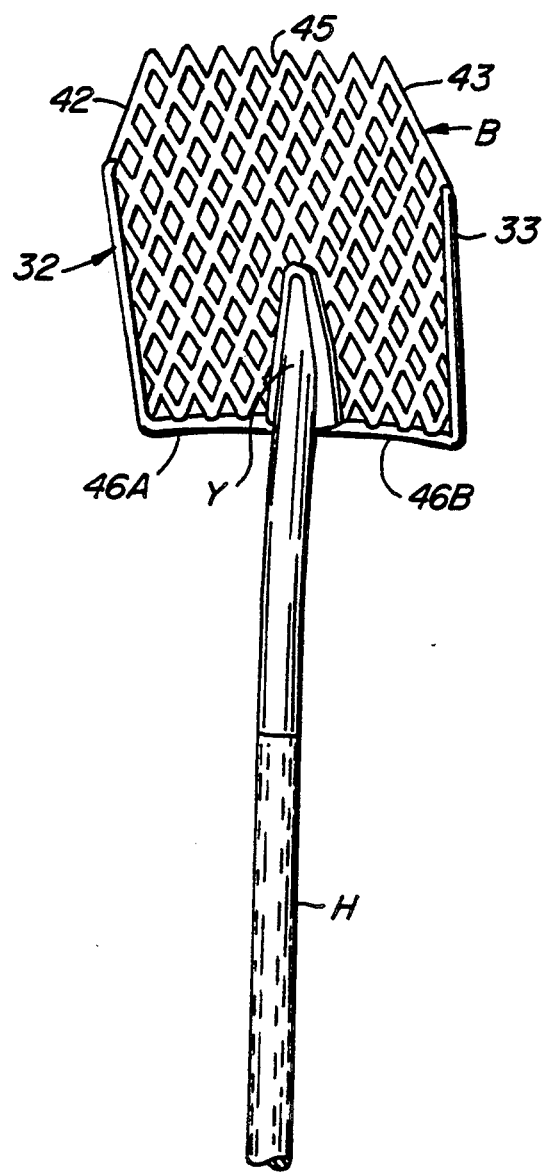
FIG. 1 is a perspective view of the shovel of this invention with the handle being shown as truncated illustrating the shovel construction.

Referring to FIG. 1, the shovel of this invention is shown in perspective held by the handle H. Handle H is conventionally forced into a yoke Y. Yoke Y is in turn fastened to shovel body B, which shovel body B is the novel portion of this invention.

Figure 2:
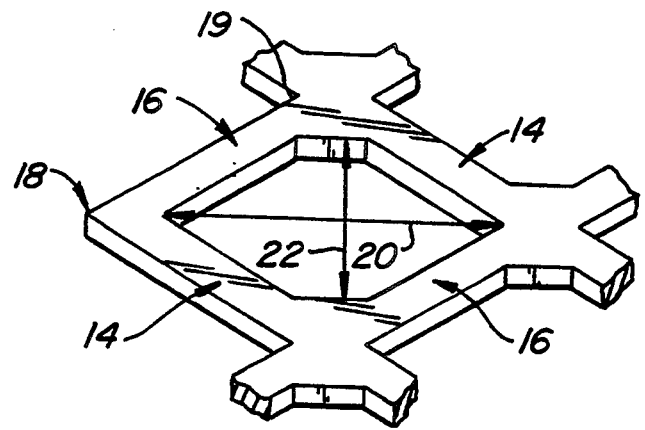
FIG. 2 is a detail of flattened expanded metal at a representative elongate "diamond" shaped opening illustrating the major and minor axes of the diamond.

A detail of the flattened metal is illustrated with respect to FIG. 2. In FIG. 2 a so-called diamond shaped section of expanded flattened metal is illustrated. Preferably, the illustrated construction is of steel.

The expanded metal includes first parallel diagonal sides 14 and second parallel diagonal side 16. Further, it can be seen that the diamond is elongate; dimension 20 on the elongate axis exceeds dimension 22. As will be apparent after referring to FIG. 1, the expanded metal of the shovel body is preferably aligned with dimension 20 parallel to the handle and with shortened axis 22 extending normal to the handle.

In the illustration of FIG. 2, trimming of sides 14, 16 has occurred to define tine 18 at the ends of the diamond shaped aperture. At the same time, a V-shaped aperture 19 is formed between adjacent tines 18.

Having said this much, return can be made to FIG. 1.

The sides of shovel body B are formed with two straight metal edges 32, 33. These respective bars impart relatively smooth and uninterrupted side edges to shovel body B, have some reinforcing effect, and allow the shovel body B at the sides to slide through and over surfaces as it works without undue interference with the otherwise irregular pattern of the expanded metal.

Similarly, the top edges 46A and 46B adjacent yoke Y are provided with straight metal edges. These edges allow for a foot hold.

The flattened expanded metal shown here is preferred. Further, it is preferred that it has and maintains an elongate aperture—although this is not required. Further, the metal is chosen to be of such a gauge that all required strength for the shovel body comes from the expanded metal.

Returning to FIG. 1, at the flattened and lead edges side and tapering edges 42, 43, cutting occurs preferably along three elongate "diamond" shaped openings—this being on either side of the leading end of the shovel. This imparts a traditional tapered shape to shovel body B.

Leading edge 45 of the shovel includes tines 18 and V-shaped depressions 19.

Figure 4:
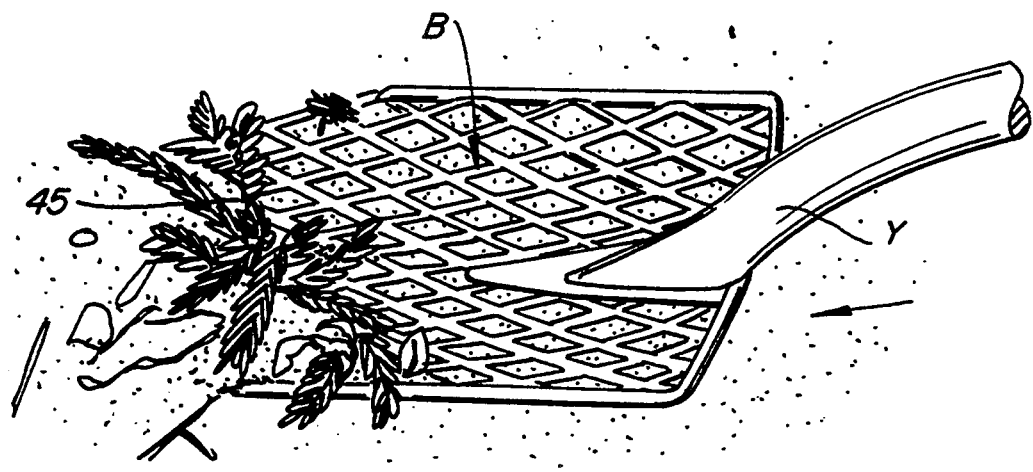
FIG. 4 is a detail of the shovel being used with the forward tines trimming weeds and the central grid member of the shovel allowing the pass through of sod while retaining weeds.

Viewing FIG. 4, working of the shovel is illustrated. Leading serrated edge 45 at respective tines 18 and V-shaped depressions 19 is shown uprooting weeds. Sod falls through the diamond shaped openings while body B retains weeds.

Figure 3:
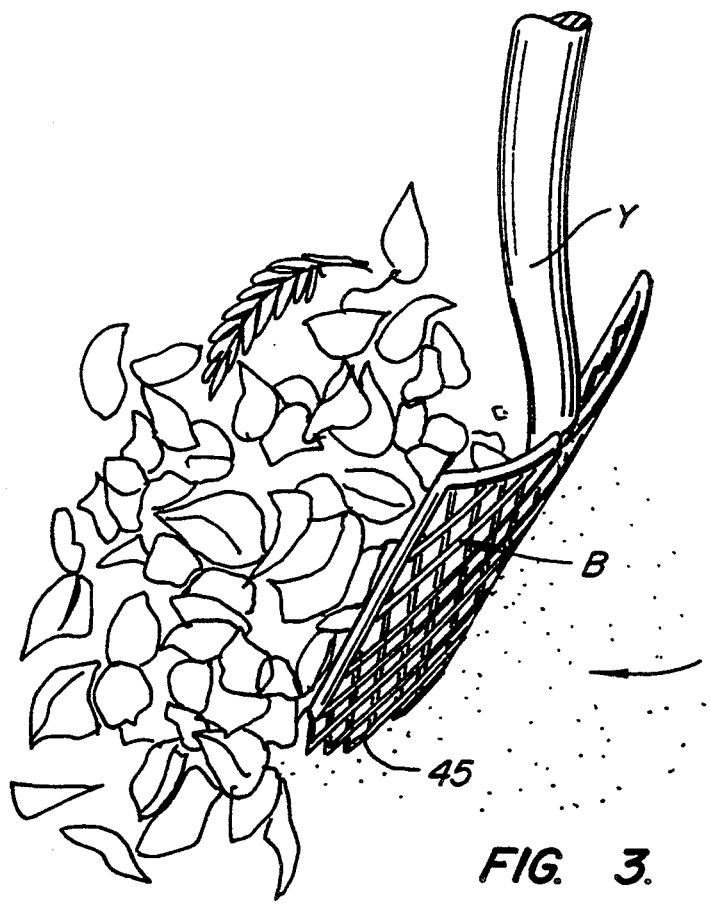
FIG. 3 is a detail of the shovel being used in a raking motion.

Viewing FIG. 3, working of the shovel is illustrated. Here the shovel is manipulated in a raking type motion with the major surface of shovel body B perpendicular to the ground.

It will be understood that although the primary utility of this invention has been illustrated utilizing gardening examples, the utility does not cease here. For example, this shovel is particularly useful in mixing, sorting and the like.

What is claimed is:

1. A shovel comprising in combination:
    a shovel handle;
    a shovel yoke for connecting said handle to a surface of said shovel;
    a shovel working surface formed of flattened expanded metal of the type that forms a grid of four sided diamond shaped openings;
        said flattened expanded metal aligned with said working surface, each said diamond shaped opening parallel to the handle of the shovel and cut to a width and length sufficient to form said shovel working surface;

straight bars affixed to said flattened expanded metal at left and right edges relative to said handle to impart even and uninterrupted side edges;

said flattened expanded metal defining front edges cut to expose the diamond shaped openings of the flattened expanded metal in a serrated configuration whereby said shovel has a said serrated configuration at said front edges;

said diamond shaped openings of said expanded metal are elongate with one dimension of said opening being larger than an adjacent normal dimension at right angles to said one dimension; and, said diamond shaped openings have said large dimension oriented parallel to said handle;

said flattened expanded metal at said cut front edges is hardened; and, said shovel working surface has an arcuate contour with respect to said yoke and handle.

* * * * *